T. Hoadley,
Moulding Clay,

N° 21,419. Patented Sep. 7, 1858.

UNITED STATES PATENT OFFICE.

THOMAS HOADLEY, OF CLEVELAND, OHIO.

MACHINE FOR MOLDING CLAY.

Specification of Letters Patent No. 21,419, dated September 7, 1858.

*To all whom it may concern:*

Be it known that I, THOMAS HOADLEY, of Cleveland, in the county of Cuyahoga and State of Ohio, have invented a new and Improved Machine for Molding or Forming Clay Pyroretorts, Tiles, and Similar Articles; and I do hereby declare that the following is a full, clear, and exact description of the same, reference being had to the annexed drawings, making a part of this specification, in which—

Figure 1:
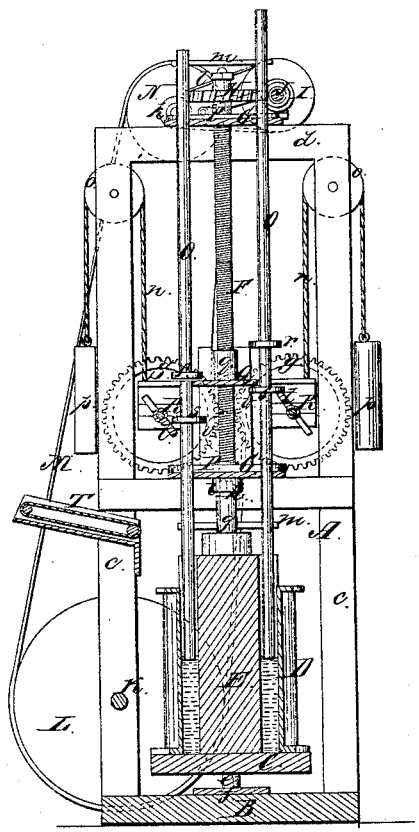
Figure 2:
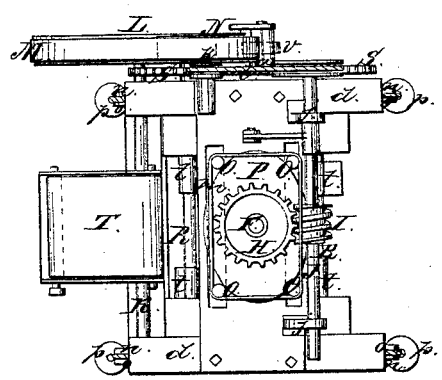
Figure 3:
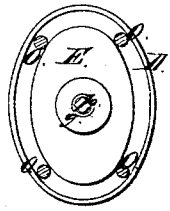

Figure 1, is a vertical central section of my invention. Fig. 2, is a plan or top view of ditto. Fig. 3, is a detached plan or top view of the mold and core of ditto.

Similar letters of reference indicate corresponding parts in the several figures.

The object of this invention is to so mold the clay that it will be of equal density throughout, each part or portion of the clay as the process of molding is carried on, being subjected to an equal ramming so that when the articles are molded they will be perfectly free from air-cells, more compact than usual and consequently more durable and less liable to leak on account of porosity, and also less liable to fracture in baking as the shrinkage will be nearly equal or uniform on account of equal or uniform density, and as there are no air cells fracture cannot occur by the expansion of the same.

To enable those skilled in the art to fully understand and construct my invention I will proceed to describe it.

A, represents a framing which supports the working parts, said framing being formed of a rectangular base B, having an upright $c$, at each corner or angle and connected at the upper ends by cross ties $d$, $d$.

C, is a bed which is allowed to rotate freely on the base B, said bed having a journal $e$, attached centrally to its under side which journal is stepped at $f$. To the upper surface of the bed C, a mold D, is permanently attached. This mold may be of cylindrical, oval or other desired form. The mold may be of metal. Within the mold a core E, is placed, said core being also permanently attached to the bed C. To the upper end of the core E, a stud $g$, is attached centrally and a square $h$, is formed on the upper end of said stud. The square $h$, receives a socket or bushing $i$, which is attached to the lower end of a vertical screw shaft F, which has its bearings in cross-plates G, G, in the framing. On the upper end of the shaft F, a worm wheel H, is placed, and a screw I, gears into said wheel, the screw I, being on a shaft J, which is placed in suitable bearings $j$, on the framing A.

K, is the driving shaft of the machine. This shaft is placed at the lower part of the framing and has a pulley L, at one end of it.

M, is a belt which passes around the pulley L, and around a pulley N, on the upper part of the framing, the pulley N, having a smaller pulley $k$, on its axis adjoining it, from which the screw shaft J, is driven by a belt $l$.

O, O, O, O, represent four cylindrical rods or rammers, the lower ends of which are fitted in the mold D, said rods or rammers passing through oblong slots in the cross plates G, G, and kept by elastic bands $m$, in contact with the peripheries of oval plates P, P, which are placed on the screw shaft F, and conform to the shape of the mold D. The bands $m$, encompass the four rods as shown clearly in Fig. 2, and the plates P, P, serve as guides to the rods.

Q, is a horizontal plate which is placed in the framing A, between the cross plates G, G. The plate Q, has a cord or chain $n$, attached to each end, and these cords or chains pass over pulleys $o$, in the uprights $c$, and have weights or counter poises $p$ attached to them. The shaft F, works through a nut $q$, at the center of plate Q, and each rod or rammer O, has a hub or boss $r$, placed on it said hubs or bosses serving as stops and enabling the plate Q, to prevent the rods or rammers descending below a certain point. On each rod or rammer O, below its hub or boss $r$, a button $s$, is placed, as shown clearly in Fig. 1, and underneath the plate Q, two shafts R, R, are placed, each shaft having two tappets $t$, $t$, placed on it, which tappets actuate the rods or rammers. The shafts R, R, have each a spur wheel S, on them at one end, and into each wheel S, a pinion $u$, gears. These pinions are placed one above the other and each has a pulley $v$, attached to it at one side, the pulleys being rather larger in diameter than the pinions $u$, and having the belt M, pass between them, as shown clearly by the dotted lines in Fig. 1.

T, is an endless apron by which the clay is fed into the mold.

The operation is as follows:—The shaft

K, is rotated in any proper way and the shaft F, and core E, is rotated by the screw I, and worm wheel H, and the rods or rammers O, are raised by the tappets $t$, the rammers falling by their own gravity as the tappets pass from underneath the buttons $s$. As the shaft K, is rotated the plate Q, is gradually raised and also the rammers, the latter being raised in consequence of the plate Q, bearing against the hubs or bosses $r$, and as the clay is gradually fed into the mold D, the rods or rammers are gradually raised corresponding with the increasing height of the clay in the mold. It will be seen therefore that the clay within the mold will be rammed down so as to be of equal density throughout.

I do not claim broadly the employment or use of rammers operated by wipers or tappets for such device is well known and in common use; but

Having thus described my invention, what I claim as new and desire to secure by Letters Patent, is,

1. The rotating mold D, and rods or rammers O, in connection with the rammer elevating plate Q, arranged for joint operation substantially as and for the purpose set forth.

2. I also claim the guides P, P, one or more, attached to the shaft F, and used in connection with the elastic bands $m$, on the rammers for the purpose set forth.

THOMAS HOADLEY.

Witnesses:
 J. C. VAIL,
 SAML. STACKWEATHER, Jr.